United States Patent [19]

Lupinski et al.

[11] 3,855,169

[45] Dec. 17, 1974

[54] ELECTROCOATING COMPOSITIONS AND METHOD FOR MAKING SAME

[75] Inventors: John H. Lupinski, Scotia; Wilson J. Barnes, Schenectady, both of N.Y.

[73] Assignee: General Electric Company, Schenectady, N.Y.

[22] Filed: June 23, 1972

[21] Appl. No.: 265,533

[52] U.S. Cl......... 260/29.2 N, 204/181, 260/47 CP, 260/65, 260/78 TF, 260/78 S
[51] Int. Cl............................................ C08g 20/32
[58] Field of Search....... 260/29.2 N, 47 CP, 78 TF, 260/78 R, 78 S

[56] References Cited
UNITED STATES PATENTS

| | | | |
|---|---|---|---|
| 2,742,440 | 4/1956 | Stott et al. | 260/29.2 N |
| 3,179,631 | 4/1965 | Endrey | 260/78 |
| 3,260,691 | 7/1966 | Lavin et al. | 260/30.2 |
| 3,440,197 | 4/1969 | Boldebuck et al. | 260/78 |
| 3,507,765 | 4/1970 | Holub | 260/29.2 N |

Primary Examiner—Murray Tillman
Assistant Examiner—J. Ziegler
Attorney, Agent, or Firm—William A. Teoli; Joseph T. Cohen; Jerome C. Squillaro

[57] ABSTRACT

Aqueous dispersions of particulated polyamide acid reaction product of aromatic diamines and chloroformylphthalic anhydrides, which have been at least partially base neutralized have been found to be valuable for continuous electrocoating. The aqueous dispersions are substantially free of titratable chloride and exhibit extended shelf stability at ambient temperatures.

4 Claims, 1 Drawing Figure

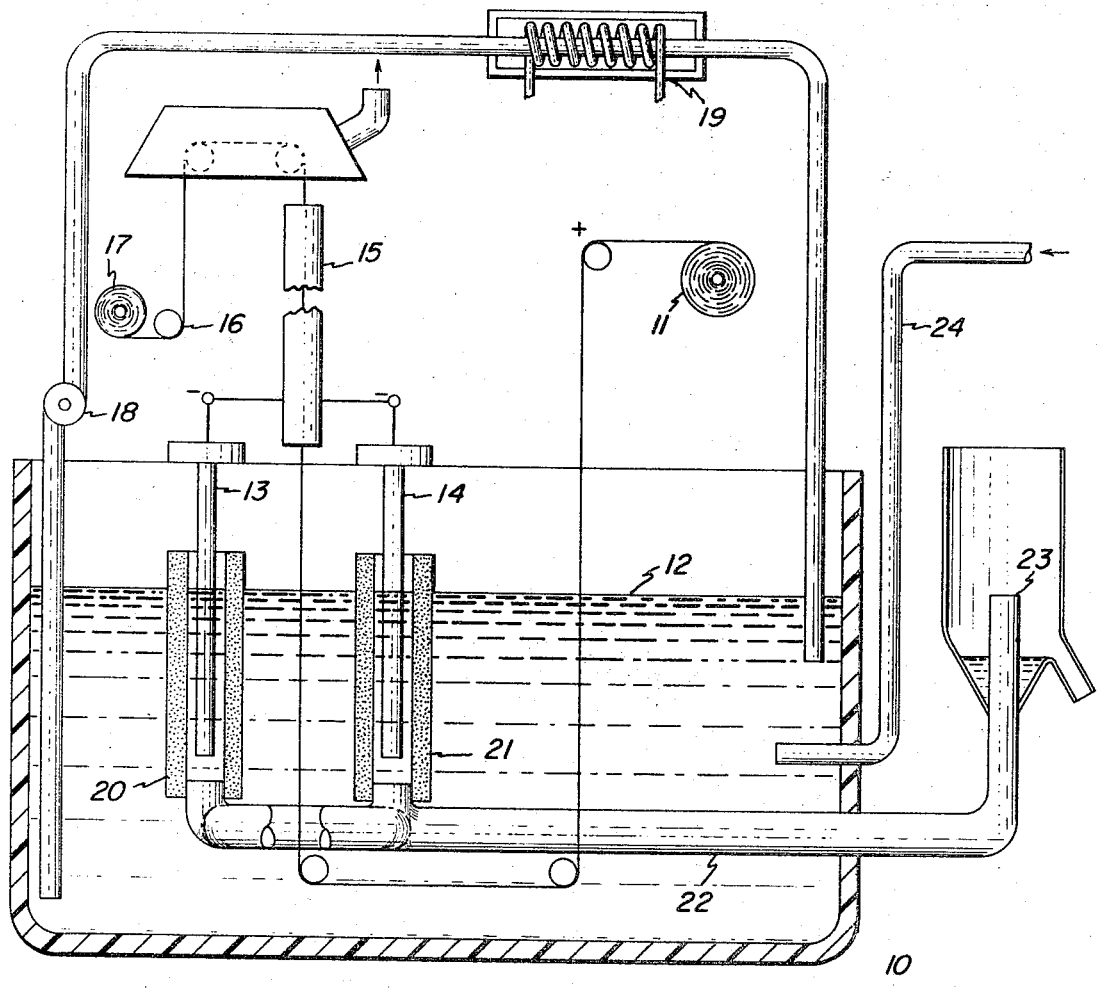

ELECTROCOATING COMPOSITIONS AND METHOD FOR MAKING SAME

The present invention relates to aqueous dispersions of certain polyamide acid reaction products which are useful as continuous electrocoating compositions and a method for making such materials.

The aqueous dispersions of the present invention are polyamide acid base mixtures having from about 0.05 to about 1.0 meq of base per gram of polymer and have a shelf stability of greater than six months if maintained at temperatures below about 45°C, and comprise by weight, A. 2 to 15% of a dispersed phase of particulated polyamide acid having less than about 25 ppm of titratable chloride based on the weight of polyamide acid, which prior to being at least partially base neutralized, is the product of reaction of substantially equal molar amounts of an organic diamine of the formula, $$NH_2RNH_2,$$

and chloroformylphthalic anhydride, and

B. 85 to 98% of a solvent phase containing as essential ingredients
 i. water and
 ii. aprotic organic solvent, where the ratio of i/ii can have a value of from 3.75 to 1.0, R is selected from $-R'QR'-$ radicals and divalent aromatic hydrocarbon radicals having from 6 to 18 carbon atoms, R' is selected from divalent aromatic hydrocarbon radicals having from 6 to 18 carbon atoms, and Q is a member selected from $C_{(2-8)}$ alkylene, O,

Si and S.

Radicals included by R and R' are for example, p-phenylene, m-phenylene, etc.; xylylene, tolylene, naphthylene, anthrylene, etc. In addition R can be

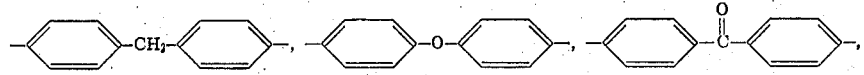

etc.

Some of the organic diamines which can be employed in the practice of the invention to make the polyamide acid reaction product are for example, meta-phenylene diamine, para-phenylene diamine, 4,4'-diamino-3,5,3',5'-tetramethyldiphenyl methane, 4,4'-diamino diphenyl propane; 4,4'-diamino-diphenylmethane; 4,4'-diamino-diphenyl sulfide; 4,4'-diamino-diphenyl sulfone; 3,3'-diamino-diphenyl sulfone; 4,4'-diamino-diphenyl ether; 4,4'-diamino-3,5,3',5'-tetrachlorodiphenyl methane; 2,6-diamino-pyridine; bis-(4-aminophenyl)diethyl silane; bis-(4-amino-phenyl)phosphine oxide; bis-(4-aminophenyl)-N-methylamine; 1,5-diamino-naphthalene; 3,3'-dimethyl-4,4'-diamino-biphenyl; 3,3'-dimethoxy benzidine; 2,4-bis-(beta-amino-t-butyl)toluene; bis-(para-beta-t-butylphenyl)ether; para-bis-(2-methyl-4-amino-pentyl) benzene; para-bis-(1,1-dimethyl-5-amino-pentyl)benzene; m-xylylene diamine; p-xylylene diamine; bis(para-amino-cyclohexyl)methane; hexamethylene diamine; heptamethylene diamine; octamethylene diamine; nonamethylene diamine; decamethylene diamine.

The aqueous dispersions of polyamide acid of the present invention can be made by initially washing the particulated reaction product of chloroformylphthalic anhydride and organic diamine with water in the absence of organic solvent to effect the removal of titratable chloride. Methods for making the particulated reaction product of chloroformylphthalic anhydride and organic diamine, which can have an average particle size of 20 microns or more are shown by Lavin et al. U.S. Pat. No. 3,260,691.

Particulated polyamide acid reaction product can be made by initially effecting reaction between substantially equal moles of chloroformylphthalic anhydride and organic diamine in the presence of organic solvent and thereafter pouring the resulting product into a precipitating solvent, such as methanol to recover a chloride containing particulated polyamide acid reaction product.

In order to utilize the particulated polyamide acid reaction product in a continuous electrocoating process, as described for example, in copending application of John Lupinski and James McQuade, Ser. No. 265,535, filing date June 23, 1972, filed concurrently herewith and assigned to the same assignee as the present invention, titratable chloride must be removed from the polyamide acid reaction product. Removal of such residual chloride, to less than 25ppm of titratable chloride based on the weight of polyamide acid has been found necessary in instances when aluminum wire or strip is utilized as the electroconducting substrate.

Although a variety of techniques can be utilized to effect the removal of titratable chloride from the particulated polyamide acid reaction product, for example, an ion-exchange resin can be employed, a convenient method is by mechanically agitating a mixture of the polyamide acid and water on a roll mill with ceramic balls over an extended period such as 16 to 20 hours. The mixture can then be transferred into a suitable container while the original container is washed along with the ceramic balls with additional portions of distilled water to salvage the polyamide acid values. The mixture then can be filtered through a suitable filter. This washing procedure can then be repeated several additional times to produce a particulated polyamide acid having an average of less than about 25 parts per million based on the weight of polyamide acid of titratable chloride.

The washed polyamide acid then can be contacted with an aprotic organic solvent, or an aqueous mixture of aprotic solvent and water. Alternatively, aprotic organic solvent can be directly added to an aqueous dispersion of the washed polyamide acid in water.

It has been found that optimum shelf stability, and continuous electrocoating performance of the aqueous polyamide acid dispersions can be achieved, if direct contact between the aprotic organic solvent and washed polyamide acid solids is avoided. It is preferred, for example, to make the aqueous electrocoating polyamide acid dispersions, by using the washed particulated polyamide acid in the form of a mixture of water and polyamide acid. Alternatively, if washed polyamide acid solids are employed, the aprotic organic solvent can be used as an aqueous mixture. The base can be added to the washed solids prior to addition of aprotic organic solvent to serve as a dispersing agent, or it can be added subsequently.

Suitable aprotic organic solvent included for example, N,N-dimethylformamide, N,N'-dimethylacetamide, N,N-diethylformamide, N,N-diethylacetamide, N,N-dimethylmethoxyacetamide, N-methylcaprolactam, dimethylsulfoxide, N-methyl-2-pyrrolidone, tetramethylurea, pyridine, dimethylsulfone, tetramethylenesulfone, N-methylformamide, N-acetyl-2-pyrrolidone, etc. Included by the bases which can be employed are for example, $NH_4OH$, tetroalkyl ammonium hydroxide, organic amines, alkali hydroxides, etc.

Experience has shown optimum electrocoating results can be achieved with the aqueous polyamide acid dispersing if the electrocoating bath is continuously agitated during electrocoating.

In order that those skilled in the art will be better able to practice the invention, the following examples are given by way of illustration and not by way of limitation. All parts are by weight.

EXAMPLE 1

A mixture of 900 parts of chloroformylphthalic anhydride and 864 parts of methylene dianiline are thoroughly mixed. There is added to the mixture, a mixture of 2,100 parts of N-methylpyrrolidone and 432 parts of triethylamine while the resulting mixture is vigorously stirred. As the mixture is stirred, the temperature rises to about 90°C. The mixture is stirred for an additional hour and a solution forms which is allowed to cool to about 50°. There is then added an additional 370 parts of N-methylpyrrolidone and 1,240 parts of xylene. After standing overnight, the solution is filtered to remove triethylaminehydrochloride. The resulting mixture is thereafter poured into excess methanol resulting in the precipitation of finely divided polyamide acid solids.

A mixture of 500 parts of the above described finely divided polyamide acid and 1,500 parts of water was placed in a container with ceramic balls. The container was put onto a rolling mill for 16-20 hours and the containers rotated at 60 revolutions per minute. The mixture was then poured into another container and the ceramic balls were washed and the washings were combined with the original mixture. The resulting mixture was then filtered using a 25-50 micron fritted glass filter. The filtrate was then discarded and a fresh amount of distilled water was added to the residue on the filter and the mixing procedure was repeated 3 more times. After 3 washings, there was obtained a mixture of about 500 parts of washed polyamide acid solids having less than about 25ppm of titratable chloride. The solids were combined with 300 parts of a 50% mixture of triethanol amine and water and about 12 parts of a 10% aqueous solution of a polymerized aryl sulfonic acid salt. The resulting mixture was then roll milled as described above for about 12 hours. There was then added to the resulting dispersion, additional water, N-methylpyrrolidone, triethanolamine and the aforementioned dispersing agent to produce a final aqueous dispersion having about 7½% solids in the dispersed phase with an average particle size between 20 to 100 microns, 67% water, about 24% of N-methylpyrrolidone and about 1½% of triethanolamine. The pH of the resulting dispersion was about 7.2.

Utilizing the apparatus in the drawing, a 2 inches wide aluminum strip was electrocoated at a rate of 30-45 inches per minute employing 150-175 volts at a current from about 2.2 to 3.2 amps using a power source not shown. The aluminum strip was placed at a positive potential as shown by the drawing with respect to the cathode. It was introduced into the bath and directed up through two adjoining cathodes to a curing tower at 15 and would onto a spool at 17, where the speed of the strip was controlled by a regulator at 16, which maintained the speed although the diameter of the wound up spool became larger. There was employed membranes in the form of ceramic alumina tubes as shown at 20 and 21 having an ID of one-half inch, OD three-quarter inch by 6 inches long with porosity of about 35%. The above described aqueous electrocoating dispersion was employed in the bath as shown at 12 and the composition of the electrocoating mixture in the cathode compartment formed of the cathodes at 13 and 14 inside the ceramic tubes, shown at 20 and 21 which had a pH of 9-10 which was above the pH of the bath. The temperature of the bath was maintained by circulating the mixture through the cooling coil at 19 by means of a pump at 18, which also served to maintain the bath composition which had a tendency to settle if left undisturbed. Removal of excess solvent phase was achieved through duct 22, which overflowed at 23, based on the electroosmotic pressure exerted across the membrane causing dual solvent transport while under continuous operation.

An electrodeposit of 21-31% solids by weight was found on the coated aluminum strip as it left the bath before passing into the coating tower at 15. The coating tower was maintained at a temperature in the range of between 150°C to 350°C. A coated strip was obtained coated with a uniform polyimide film of about 0.4 to about 0.6 mil on each side including a uniform coating on the edges.

An aqueous electrocoating dispersion was prepared utilizing the above described polyamide acid. The washed solids, however, were directly contacted with N-methylpyrrolidone in the substantial absence of water resulting in a polyamide acid mixture having a weight percent of organic solvent in the solvent phase outside the above described limits. The resulting polyamide acid mixture was then neutralized with triethanolamine to the same degree as previously defined. There was then added to the resulting organic solvent mixture, sufficient water to produce an emulsion having the same weight proportions of solids, N-methylpyrrolidone and water. The resulting emulsion was electrocoated in accordance with the above described procedure using the same apparatus. It was found that the emulsion was not suitable for continuous electrocoating because the wet deposit upon heating in the curing tower resulted in the production of a large volume of low viscosity polymer solution. The low viscosity liquid could not be dried properly in the curing tower in time and it ran back into the bath.

Based on these results, one skilled in the art would know that the electrocoating composition in the form of the aqueous dispersion as made in accordance with the present invention consisting of a dispersed phase and a solvent phase which is substantially free of dissolved polyamide acid, can be satisfactorily electrocoated in a continuous manner to form electrodeposited polyamide acid, which is convertible to polyimide film in a continuous manner. When the polyamide acid is made by a different technique, such as the contacting of the polyamide acid with organic solvent and adding water to the organic phase resulting in an emulsion having an aqueous solvent phase which contains a substantial amount of the dissolved polyamide acid, the resulting emulsion does not satisfactorily electrocoat in a continuous manner.

What we claim as new and desire to secure by Letters Patent of the United States is:

1. Polyamide acid base mixtures having from about 0.05 to about 1.0 meq of base per gram of polyamide acid, comprising by weight,
   A. 2 to 15% of a dispersed phase of a particulated polyamide acid having less than about 25 ppm of titratable chloride based on the weight of polyamide acid, which prior to being at least partially base neutralized is the product of reaction of substantially equal molar amounts of an organic diamine of the formula, $$NH_2RNH_2,$$

and chloroformylphthalic anhydride,
   B. 85 to 98% of a solvent phase containing as essential ingredients,
      i. water and
      ii. organic solvent selected from a class consisting of N,N-dimethylformamide, N,N-dimethylacetamide, N,N-diethylformamide, N,N-diethylacetamide, N,N-dimethylmethoxyacetamide, N-methylcaprolactam, dimethylsulfoxide, N-methyl-2-pyrrolidone, tetramethylurea, pyridine, dimethylsulfone, tetramethylenesulfone, N-methylformamide, and N-acetyl-2-pyrrolidone,
   where the ratio of i/ii has a value of from 3.75 to 1.0, R is selected from the class consisting of a divalent aromatic hydrocarbon radical having from 6 to 18 carbon atoms, and R'QR', R' is a divalent aromatic selected from the class R radicals and Q is a member selected from O,

$C_{(2-8)}$ alkylene, Si and S.

2. An electrocoatable composition in accordance with claim 1, where the organic diamine is methylene dianiline.

3. A composition in accordance with claim 1, where the organic solvent is N-methylpyrrolidone.

4. A method for making an aqueous electrocoating mixture which comprises,
   1. effecting reaction between substantially equal molar amounts of chloroformylphthalic anhydride and an organic diamine of the formula $$NH_2RNH_2,$$

in the presence of an organic solvent to produce a polyamide acid and thereafter effecting the precipitation of the polyamide acid,
   2. washing the precipitated polyamide acid reaction product to produce solids having less than 25 ppm of titratable chloride, and
   3. agitating a mixture consisting essentially of the washed polyamide acid solids, water, organic solvent and base to provide for the production of an aqueous electrocoating mixture comprising by weight
   A. 2 to 15% of polyamide acid
   B. 85 to 98% of solvent containing as essential ingredients,
      (i) water and
      ii. organic solvent selected from a class consisting of N,N-dimethylformamide, N,N-diethylacetamide, N,N-diethylformamide, N,N-diethylacetamide, N,N-dimethylmethoxyacetamide, N-methylcaprolactam, dimethylsulfoxide, N-methyl-2-pyrrolidone, tetramethylurea, pyridine, dimethylsulfone, tetramethylenesulfone, N-methylformamide, and N-acetyl-2-pyrrolidone, where the ratio (i)/(ii) has a value of from 3.75 to 1.0, and sufficient base to provide from about 0.05 to about 1.0 meq of base per gram of polymer, where R is selected from a divalent aromatic hydrocarbon radical having from 6 to 18 carbon atoms, and R'QR', R' is a divalent aromatic selected from R radicals and Q is a member selected from —O—,

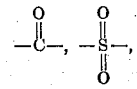

$C_{(2-8)}$ alkylene, Si and S.

* * * * *